United States Patent [19]

Yamazaki

[11] Patent Number: 4,603,412
[45] Date of Patent: Jul. 29, 1986

[54] DISC ROTATION SERVO CONTROL APPARATUS IN A DISC PLAYER

[75] Inventor: Shohei Yamazaki, Hamamatsu, Japan

[73] Assignee: Nippon Gakki Seizo Kabushiki Kaisha, Hamamatsu, Japan

[21] Appl. No.: 549,977

[22] Filed: Nov. 8, 1983

[30] Foreign Application Priority Data

Nov. 15, 1982 [JP]  Japan .................................. 57-199028

[51] Int. Cl.⁴ ............................................ G11B 19/28
[52] U.S. Cl. ....................................... 369/50; 369/43; 369/239; 369/111; 360/73; 358/342; 358/338
[58] Field of Search ...................... 369/50, 43, 44, 239, 369/240, 266; 360/73, 36.1; 358/338, 342, 332, 321, 337

[56] References Cited

U.S. PATENT DOCUMENTS

| 4,190,860 | 2/1980 | Somers | 369/44 |
| 4,223,349 | 9/1980 | Dakin | 369/50 |
| 4,236,050 | 11/1980 | Winslow | 360/73 |
| 4,338,683 | 7/1982 | Furukawa | 369/50 |

Primary Examiner—Alan Faber
Attorney, Agent, or Firm—Spenley Horn Jubas & Lubitz

[57] ABSTRACT

The rotation speed of a disc rotation motor is controlled such that a synchronizing signal derived from an output signal reproduced from a disc coincides with a reference oscillation frequency. The amount of data accumulated in a memory provided for absorbing jitter of the output signal reproduced from the disc is detected. In response to a result of the detection, a control signal in the disc rotation control is corrected such that the amount of data accumulated in the memory becomes substantially constant.

8 Claims, 7 Drawing Figures

DISC ROTATION SERVO CONTROL APPARATUS IN A DISC PLAYER

Background of the Invention (a) Field of the Invention

This invention relates to a disc rotation servo control apparatus in a disc player for a digital audio disc or video disc and, more particularly, to a disc rotation servo control apparatus for rotating a disc recorded in a CLV system such that its linear velocity of the disc rotation will remain accurately constant.

(b) Background of the Invention

In a CLV type disc player, the rotation speed of a disc rotating motor is variably controlled in response to a position where information is reproduced from the disc so that the disc is played at a constant linear velocity.

FIG. 1 shows a prior art CLV type disc rotation control apparatus. In this figure, a disc 51 is rotated by a disc rotating motor 52. A laser pickup head 53 for reading signals on the disc is fed in a radial direction of the disc 51. A signal which has been detected by the laser pickup head 53 is supplied through a preamplifier 54, an RF amplifier 55 and a waveform-shaping circuit 56 to a post-stage circuitry for signal processings such as demodulation. This signal is also applied to a clock reproducing circuit 57 for reproducing of a clock signal. The clock signal, together with a wave-form shaped reproduced signal, is applied to a synchronizing signal detecting circuit 58 where a synchronizing signal in the reproduced signal is detected and extracted. The extracted synchronizing signal is supplied to a phase comparator 60 through a frequency divider circuit 59. The phase comparator 60 compares frequencies and phases of the frequency-divided synchronizing signal and a reference signal from a reference oscillator 61. The disc rotating motor 52 is controlled by a disc rotation servo circuit 62 so that the frequencies and phases of these signals will coincide with each other.

Since the disc rotation control in the prior art apparatus is effected depending upon the synchronizing signal only, difficulty arises in controlling the linear velocity of the disc to a predetermined value when the synchronizing signal does not represent the linear velocity accurately due to causes such as a drop-out of a reproduced signal.

SUMMARY OF THE INVENTION

An object of the invention is to provide a disc rotation servo control apparatus in a disc player capable of controlling the disc rotation such that the linear velocity of the disc will be always maintained constant.

Another object of the invention is to provide a disc rotation servo control apparatus capable of maintaining the linear velocity of the disc rotation constant even in the circumstances where a synchronizing signal derived from a signal reproduced from the disc does not represent an accurate linear velocity of the disc rotation.

Still another object of the invention is to provide a disc rotation servo control apparatus capable of efficiently reducing the capacity of a memory provided for storing data for absorbing a jitter.

In a disc rotation servo control apparatus in which the rotation speed of a disc rotating motor is controlled so that a synchronizing signal derived from a signal reproduced from the disc will coincide in phase with a reference oscillation frequency signal, it is a characteristic feature of the present invention to correct a control signal used for controlling the rotation speed of the disc rotating motor in response to the amount of data accumulated in a memory which temporarily stores the signal reproduced from the disc.

BRIEF DESCRIPTION OF THE DRAWINGS

In the accompanying drawings.

DESCRIPTION OF PREFERRED EMBODIMENTS

According to the invention, the correction of a control signal used for controlling the rotation speed of the disc rotating motor is made in response to the amount of data accumulated in a memory provided in the disc player for absorbing jitter fluctuation of a signal in the direction of a time axis. In the disc player, a reproduced signal is once stored in this memory for absorbing jitter and the stored signal is then read out by an accurate clock signal. If the linear velocity of the disc rotation is controlled to a reference value, the amount of data accumulated in the memory is constant, for the rate at which the data is written is equal to the one at which the data is read out. If, however, the linear velocity of the disc rotation becomes faster than the reference value, the rate at which the data is written becomes faster than the one at which the data is read out so that the amount of the accumulated data increases. If the linear velocity becomes slower than the reference value, the rate at which the data is written becomes slower than the one at which the data is read out so that the amount of the accumulated data decreases. Accordingly, the state of control of the linear velocity can be detected by checking increase or decrease of the amount of data accumulated in the memory.

The present invention which is based on this principle realizes an accurate disc rotation servo control by correcting the rotation speed of the disc rotating motor in response to the amount of data accumulated in the memory originally provided for absorbing jitter, i.e., the magnitude of the amount of data accumulated in the memory or of the amount of bits still available for storage in the memory, or the rate of increase or decrease of the amount of data accumulated in the memory or of the amount of bits still available for use in the memory.

Figure 1:
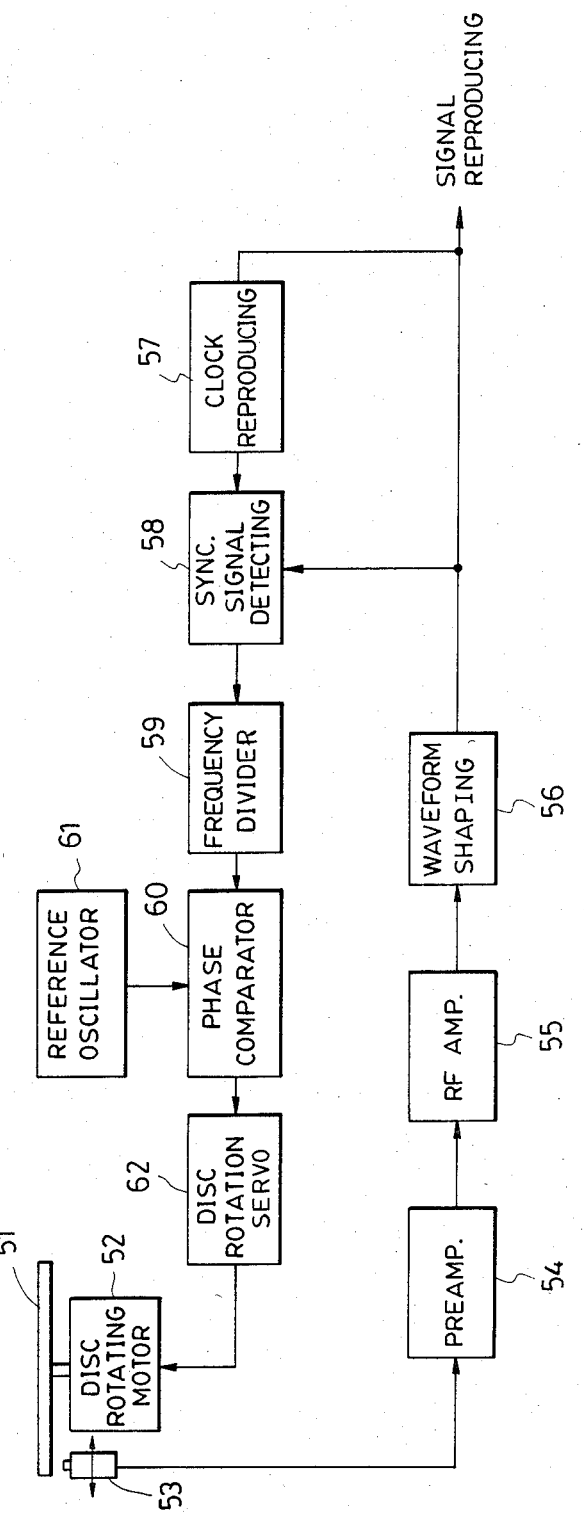
FIG. 1 is a block diagram showing the prior art CLV type disc rotation servo control apparatus.
Figure 2:
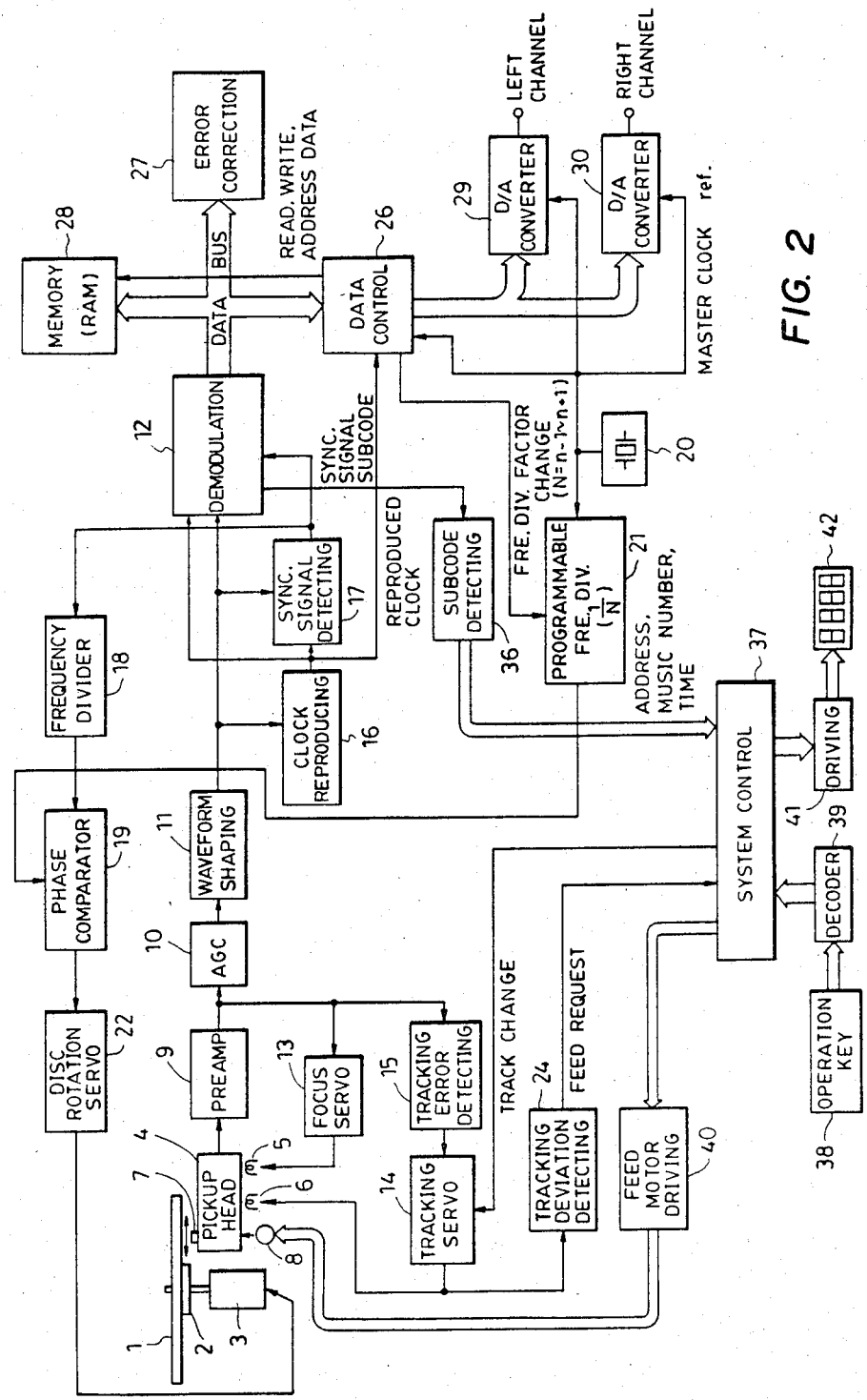
FIG. 2 is a block diagram showing an embodiment of the disc rotation servo control apparatus according to the invention.

FIG. 2 shows a general structure of an overall control system for an optical type digital audio disc player to which the present invention is applied. In this figure, a disc 1 is placed on a turntable 2 and driven by a disc rotating motor 3. An optical type pickup head 4 contains a semiconductor laser, an optical system, a light-receiving element, a focus control coil 5 and a tracking control coil 6. The pickup head 4 projects a laser beam from an objective lens 7 onto the recording surface of the disc 1 and receives the reflected beam through the objective lens 7. The pickup head 4 is fed in the radial direction of the disc 1 by means of a feed motor 8.

A signal which has been detected by the pickup head 4 is supplied to a demodulation circuit 12 through a preamplifier 9, an AGC (automatic gain control) circuit 10 and a waveform shaping circuit 11.

A focus servo circuit 13 detects out-of-focusing of the laser beam in response to a light receiving signal and actuates the focus control coil 5 so that the laser beam is accurately focused on the recording surface of the disc.

A tracking error detecting circuit 15 detects, responsive to the light receiving signal, deviation of the laser beam from the pit train and a tracking servo circuit 14 thereupon actuates the tracking control coil 6 to correct the error. In a case where the deviation in the tracking has enlarged with the progress of reproduction of the disc to such a degree that the tracking control coil 6 can no longer correct the deviation, a tracking deviation detecting circuit 24 delivers out a feed request signal so that the feed motor 8 is driven by a feed motor driving circuit 40 through a system control circuit 37.

The output signal of the waveform shaping circuit 11 is not only supplied to the demodulation circuit 12 but also utilized for preparation of a detection signal in the CLV (constant linear velocity) disc rotation servo. More specifically, the output signal of the waveform shaping circuit 11 is applied to a clock signal reproducing circuit 16 where a clock signal is reproduced. A synchronizing signal detecting circuit 17 detects and delivers out a synchronizing signal contained in the output signal of the waveform shaping circuit 11. The synchronizing signal delivered from the synchronizing signal detecting circuit 17 is divided in frequency by a frequency divider circuit 18 and thereafter is applied to a phase comparator circuit 19. The phase comparator circuit 19 compares the frequency divided signal with a signal obtained by frequency-dividing by a programmable frequency divider circuit 21 a master clock pulse generated from a master clock oscillator circuit 20 and controls the disc rotating motor 3 through a disc rotation servo circuit 22 so that these signals are brought in phase with each other.

The demodulation circuit 12 demodulates the signal which was recorded on the disc 1 after being modulated by EFM (eight to fourteen modulation) to the original 8-bit signal and also removes signals such as coupling bits and a synchronizing signal which have now become unnecessary. A data control circuit 26, an error correction circuit 27 and a memory circuit 28 serve to deinterleave an output signal of the demodulation circuit 12 which was recorded on the disc 1 after being interleaved to the original signal, check whether there is an error involved in the signal, effect error correction in the error correction circuit 27 if there is an error and effect error interpolation if the error is too large to be corrected. Further, data alignment and absorption of wow and flutter are performed by storing the signal after the error correction or interpolation in the memory circuit 28 at a timing of the reproduced clock signal and thereafter reading out this signal at a timing of the master clock pulse.

A signal provided by the memory circuit 28 which is a time division multiplexed signal of a right channel signal and a left channel signal is applied to D/A converters 29 and 30 so as to be separated to the right and left channels at a timing of the master clock pulse and converted to the original analog signals, i.e., audio signal.

A subcode detection circuit 36 detects subcodes which are codes representing an address, the number of music, time required for performing the piece of music etc. from the signal which has been demodulated by the demodulation circuit 12 and supplies the detected subcodes to the system control circuit 37. The system control circuit 37 receives address, the number of music etc. designated by an operation key 38 through a decoder 39, compares them with the detected subcodes and drives the feed motor 8 through the feed motor driving circuit 40 so that they coincide with each other. The detected subcodes are indicated by a display unit 42 through a driving circuit 41.

Figure 3:
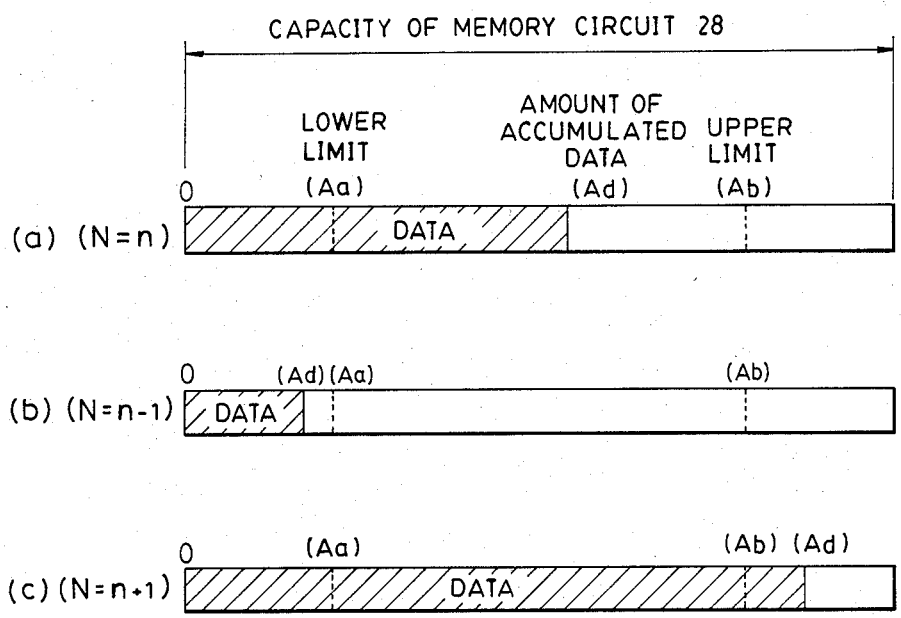
FIG. 3(a) through 3(c) are diagrams for explaining a frequency dividing factor changing operation in a programmable frequency divider circuit shown in FIG. 2.

The data control circuit 26 performs the correction in the disc rotation servo by detecting the amount of data accumulated in the memory circuit 28 and thereupon changing the frequency dividing factor of the programmable frequency divider circuit 21. For achieving this, a lower limit value Aa and an upper limit value Ab are set in the memory capacity of the memory circuit 28 as illustrated in FIGS. 3(a)-3(c). When the amount Ad of accumulated data is Aa<Ad<Ab, as shown in FIG. 3(a), this state is assumed to be a normal state and the frequency dividing factor N of the programmable frequency divider circuit 21 is controlled to a frequency dividing factor n at which the reference linear velocity is obtained. When the amount Ad is Ad<Aa as shown in FIG. 3(b), this is assumed to be a state in which the linear velocity is slower than the reference value and the frequency dividing factor N is switched to N=n−1 so that the frequency of the clock signal provided by the programmable frequency divider circuit 21 is increased and the linear velocity thereby is increased. When the amount Ad is Ab<Ad as shown in FIG. 3(c), this is assumed to be a state in which the linear velocity is faster than the reference value and the frequency dividing factor N is switched to N=n+1 so that the frequency of the clock signal provided by the programmable frequency divider circuit 21 is decreased and the linear velocity thereby is decreased.

Figure 4:
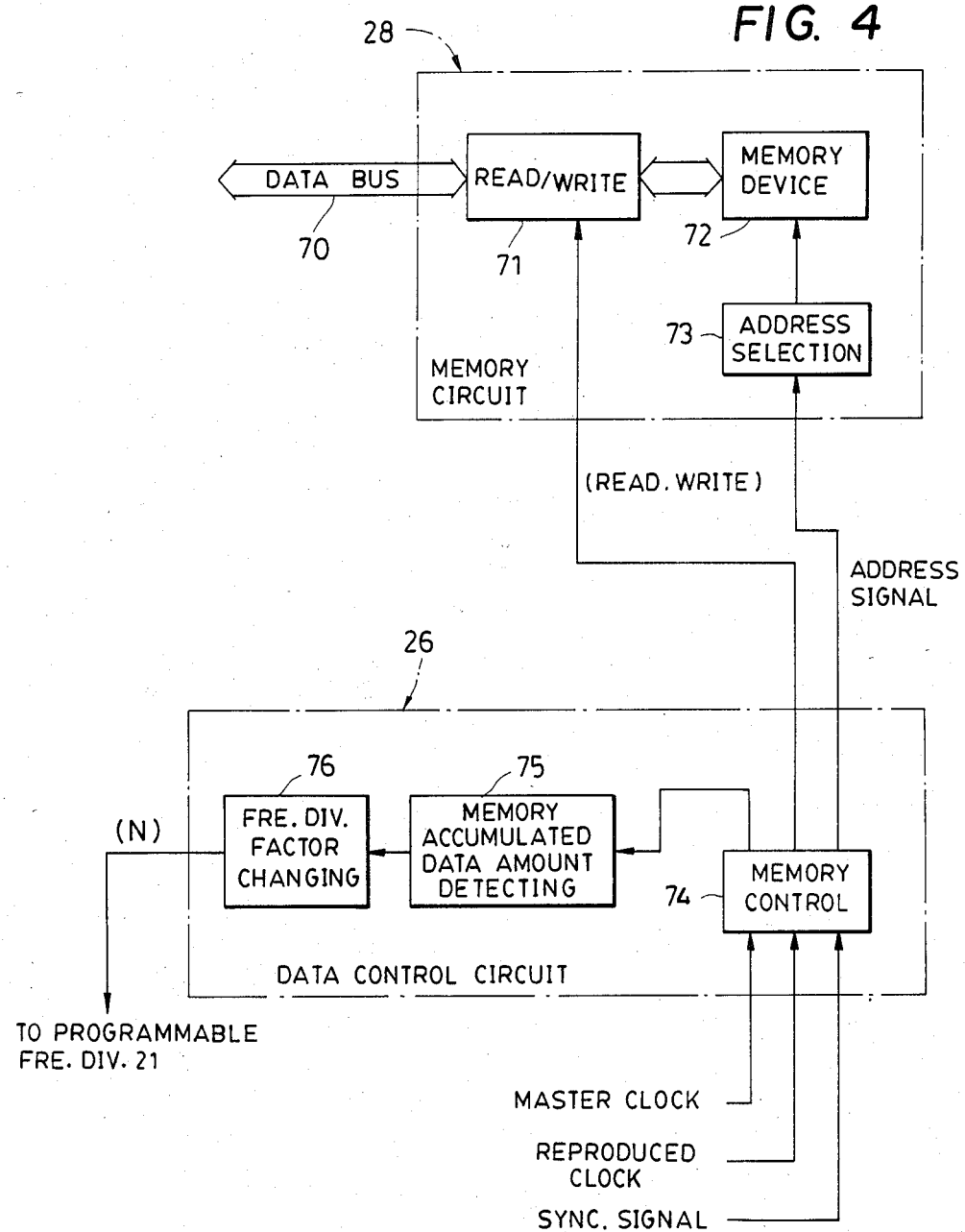
FIG. 4 is a block diagram showing a specific example of memory circuit 28 and a data control circuit 26.

FIG. 4 shows a specific example of the memory circuit 28 and the data control circuit 26 of FIG. 2. In the memory circuit 28, a read/write circuit 71 writes data from a data bus 70 into a memory device 72 in response to a write command from the data control circuit 26. The read/write circuit 71 also reads out data from the memory device 72 and provide the read out data to the data bus 70 in response to a readout command from the data control circuit 26. An address selection circuit 73 selects addresses from writing into and reading from the memory device 72 in response to address information supplied from the data control circuit 26.

In the data control circuit 26, a memory control circuit 74 writes data into the memory circuit 28 in response to the clock signal from the clock reproducing circuit 16 in a state in which the data is synchronized by the synchronizing signal from the synchronizing signal detecting circuit 17. The memory control circuit 74 also reads out data from the memory circuit 28 in response to the master clock pulse from the master clock oscillator circuit 20. A memory accumulated data amount detecting circuit 75 detects the amount Ad of the accumulated data in the memory circuit 72 and variably controls the frequency dividing factor N of the programmable frequency divider circuit 21 through a frequency dividing factor changing circuit 76 depending upon the relationship of the accumulated data amount Ad to the set lower and upper limit values Aa and Ab. Thus, the correction of the disc rotation speed is realized.

Figure 5:
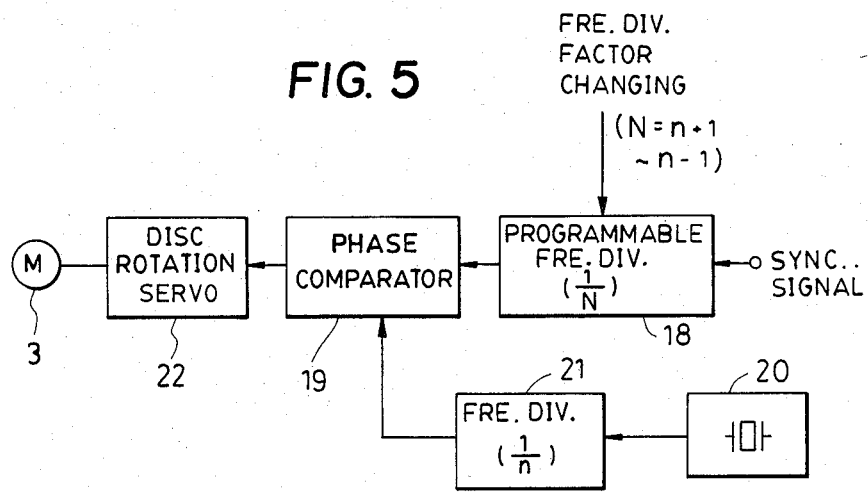
FIG. 5 is a block diagram showing another embodiment of the disc rotation servo control apparatus according to the invention.

Instead of variably controlling the frequency dividing factor of the master clock pulse from the master clock oscillator circuit 20 as in the embodiment of FIG. 2, the correction of the disc rotation speed can be effected by variably controlling the frequency dividing factor of the reproduced clock signal. FIG. 5 shows an embodiment employing such construction. In FIG. 5, the same component parts as those in FIG. 2 are designated by the same reference characters.

In FIG. 5, a frequency divider circuit 21' replaces the programmable frequency divider circuit 21 of FIG. 2. The circuit 21' divides the frequency of the master clock pulse generated by the master clock oscillator circuit 20 at a constant frequency dividing factor n. The synchronizing signal which has been detected by the synchronizing signal detecting circuit 17 is divided in frequency by a programmable frequency divider circuit 18' which replaces the frequency divider circuit 18 of FIG. 2. The phase comparator circuit 19 compares phases of an output signal of the frequency divider circuit 21' and an output signal of the programmable frequency divider circuit 18' with each other and controls the disc rotating motor 3 through the disc rotation servo circuit 22 in such a manner that the frequency and phase of these signals coincide with each other.

In the programmable frequency divider circuit 18', the frequency dividing factor N is variably controlled in response to detection by the data control circuit 26 of the amount Ad of data accumulated in the memory. Conversely to the embodiment of FIG. 2, since the frequency dividing factor of the reproduced clock signal is varied in this embodiment, the frequency dividing factor N is switched to N=n+1 when the amount Ad is smaller than the set lower limit Aa, i.e., the linear velocity of the disc is slower than the reference value whereas the frequency dividing factor N is switched to N=n−1 when the amount Ad is larger than the upper limit value Ab, i.e., the linear velocity is faster than the reference value. Thus, the correction of the disc rotation speed can be made in a similar manner to the embodiment of FIG. 2.

This embodiment of FIG. 4 has the additional advantage that writing of data exceeding the memory capacity is prevented so that allowance for the memory capacity can be minimized and therefore the memory can be made compact.

In the above described embodiments, the correction of the disc rotation speed is made on the basis of the magnitude of the amount of data accumulated in the memory. Alternatively, the disc rotation speed may be controlled by detecting a state of increase or decrease of the amount of data accumulated in the memory, for the error in the disc rotation speed originally appears not as the amount of the data accumulated in the memory but as a rate of increase or decrease of such amount of data.

What I claim is:

1. A disc rotation servo control apparatus in a disc player comprising:
   synchronizing signal detecting means for detecting a synchronizing signal contained in a reproduced signal correspoinding to pits read from a disc;
   reference oscillator means for generating a signal of a predetermined frequency;
   variable frequency divider means for frequency-dividing an output of said reference oscillator means by a predetermined frequency dividing factor thereby to provide a reference signal;
   comparator means for comparing phases of the synchronizing signal and the reference signal to detect a phase error between these signals, the disc rotation being controlled by an output of said comparator means in such a manner that said phase error will become zero;
   memory means for temporarily storing the reproduced signal corresponding to the pits read from the disc; and
   data amount detecting means for detecting the amount of data accumulated in said memory means, the frequency dividing factor of said variable frequency divider means being controlled by an output of said data amount detecting means.

2. A disc rotation servo control apparatus as defined in claim 1 wherein the control of the frequency dividing factor is performed in such a manner that the frequency dividing factor increases when the amount of data accumulated in said memory means is larger than a predetermined amount whereas the frequency dividing factor decreases when the amount of data is smaller than the predetermined amount.

3. A disc rotation servo control apparatus as defined in claim 2 wherein the disc player includes a memory for absorbing a jitter, wherein data is written into the memory at a rate corresponding to the reading of data from a disc and data is read out of the memory at a controlled rate, wherein said memory is utilized as said memory means.

4. A disc rotation servo control apparatus in a disc player comprising:
   synchronizing signal detecting means for detecting a synchronizing signal contained in a reproduced signal correspoinding to pits read from a disc;
   variable frequency divider means for frequency-dividing an output of said synchronizing signal detecting means by a predetermined frequency dividing factor;
   reference oscillator means for generating a signal of a predetermined frequency;
   comparator means for comparing phases of the output of the variable frequency divider means and the output of said reference oscillator means to detect a phase error between these outputs, the disc rotation being controlled by an output of said comparator means in such a manner that said phase error will become zero;
   memory means for temporarily storing the reproduced signal corresponding to the pits read from the disc; and
   data amount detecting means for detecting the amount of data accumulated in said memory means, the frequency dividing factor of said variable frequency divider means being controlled by an output of said data amount detecting means.

5. A disc rotation servo control apparatus as defined in claim 4 wherein the control of the frequency dividing factor is performed in such a manner that the frequency dividing factor decreases when the amount of data accumulated in said memory means is larger than a predetermined amount whereas the frequency dividing factor increases when the amount of data is smaller than the predetermined amount.

6. A disc rotation servo control apparatus as defined in claim 5 wherein the disc player includes a memory for absorbing a jitter, wherein data is written into the memory at a rate corresponding to the reading of data from a disc and data is read out of the memory at a controlled rate, wherein said memory is utilized as said memory means.

7. A disc player comprising:
- means for rotating a disc of the type having a synchronizing signal contained in a data signal recorded on the disc;
- means for reading the data signal from the disc;
- synchronizing signal detecting means for detecting the synchronizing signals from the read data signal;
- reference oscillator means for generating a signal of predetermined frequency;
- variable frequency divider means for frequency dividing the output of the reference oscillator means by a predetermined frequency dividing factor thereby to provide a reference signal;
- comparator means for comparing the phases of the synchronizing signal and the reference signal to detect a phase error, wherein the means for rotating are controlled by an output of the comparator means to achieve a rotation rate at which the phase error is zero;
- memory means for temporarily storing the read data signal; and
- data detecting means for monitoring the data accumulated in the memory means and controlling the frequency dividing factor as a function of the monitored data.

8. A disc player comprising:
- means for rotating a disc of the type having a synchronizing signal contained in a data signal recorded on the disc;
- means for reading the data signal from the disc;
- synchronizing signal detecting means for detecting the synchronizing signal from the read data signal;
- variable frequency divider means for frequency dividing the output of the synchronizing signal detecting means by a predetermined frequency dividing factor;
- reference oscillator means for generating a signal of predetermined frequency;
- comparator means for comparing the phases of the output of the frequency divider means and the output of the reference oscillator means to detect a phase error, wherein the means for rotating are controlled by an output of the comparator means to achieve a rotation rate at which the phase error is zero;
- memory means for temporarily storing the read data signal; and
- data detecting means for monitoring the data accumulated in the memory means and controlling the frequency dividing factor as a function of the monitored data.

* * * * *